H. A. PINEGAR.
BRAKE ATTACHMENT FOR VEHICLES.
APPLICATION FILED OCT. 27, 1913.
1,114,382.
Patented Oct. 20, 1914.
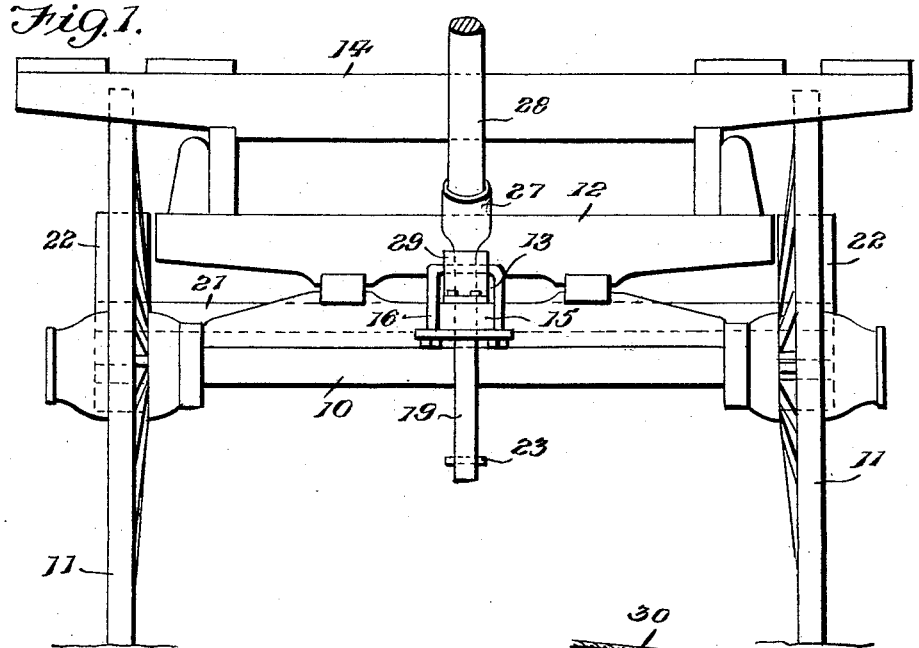
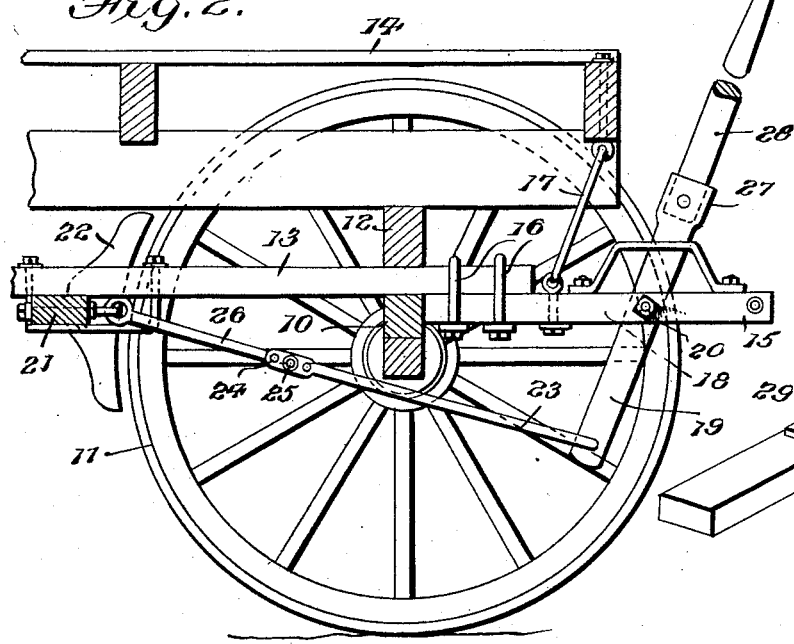
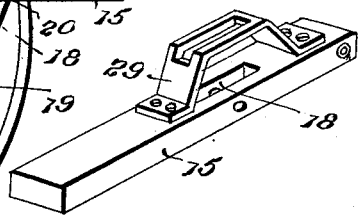
Inventor
H. A. Pinegar

UNITED STATES PATENT OFFICE.

HARVEY A. PINEGAR, OF WELLINGTON, UTAH.

BRAKE ATTACHMENT FOR VEHICLES.

1,114,382.   Specification of Letters Patent.   Patented Oct. 20, 1914.

Application filed October 27, 1913. Serial No. 797,561.

*To all whom it may concern:*

Be it known that I, HARVEY A. PINEGAR, citizen of the United States, residing at Wellington, in the county of Carbon and State of Utah, have invented certain new and useful Improvements in Brake Attachments for Vehicles, of which the following is a specification.

This invention relates to brake operating attachments for vehicles, more particularly to hay racks and similar vehicles, and has for one of its objects to provide a simply constructed device whereby the brake may be actuated from the top of the load regardless of its size or bulk.

Another object of the invention is to provide a simply constructed device which may be applied without material structural change to vehicles of various forms and to vehicles employed for various purposes.

With these and other objects in view the invention consists in certain novel features of construction as hereinafter shown and described and then specifically pointed out in the claims, and in the drawings illustrative of the preferred embodiment of the invention, Figure 1 is a rear elevation of a vehicle with the improvement applied. Fig. 2 is a side elevation partly in section of the parts shown in Fig. 1. Fig. 3 is a detached perspective view of the main supporting member of the device.

Corresponding and like parts are referred to in the following description and indicated in all the views of the drawings by the same reference characters.

The improved device may be adapted without material structural change to vehicles of various forms, but is more particularly applicable to an ordinary hay rack, and for the purpose of illustration is shown thus applied, the rear axle being represented at 10, the rear wheels at 11, the rear bolster at 12, the reach at 13, and the rack frame represented as a whole at 14, these parts being of the ordinary construction.

The reach 13 extends rearwardly of the axle 10 as shown, and this rearward extension is utilized to support the attachment which consists of a main body member 15 detachably coupled by suitable devices, such as U-bolts 16, to the rearward extension of the reach. At its forward end the member 15 bears against the rear face of the axle 10 and is thus supported rigidly in position. If required the member 15 may be further supported by a suspension device 17 from the frame of the rack 14, as shown. The member 15 is provided with a vertical slot represented at 18, and extending through this slot is a lever 19, the lever being pivoted at 20 within the slot. A brake beam is represented conventionally at 21 carrying brake shoes 22, the brake beam and the shoes being attached in the usual manner to the reach 13. A pull rod 23 is connected at one end to the lever member 19 and is forked at the other end and provided with a plurality of apertures 24 spaced apart, the apertures designed to receive a pivot pin 25 to which an extension pull rod 26 is coupled at one end and coupled at the other end to the beam 21. By adjusting the pivot 25 in the apertures 24 it will be obvious that the length of the pull members 23—26 may be altered as required. At its upper end the lever member 19 is provided with a socket 27 to receive an extension pull handle 28. Connected to the member 15 is a guide member 29 having a longitudinal slot through which the lever member 19 extends, and is supported thereby against lateral displacement. By this means the movement of the lever is controlled and lateral movement prevented, while at the same time permitting the requisite forward and rearward movement.

The member 28 may be of any required length, and connected thereto at its upper end is a pull member 30 such as a rope, wire, cable, or the like, and which leads forwardly over the load to a position convenient to the driver upon the load. By this simple means no matter what size of load may be placed upon the rack 14 the pull member 30 can be actuated from any points on the load. When hauling bulky loads, such as hay and the like, much difficulty has been heretofore experienced in applying brakes to the vehicle, as the size of the load prevents the driver upon the load from conveniently reaching the ordinary brake mechanism, but with the improved device no matter how large or bulky the load may be, the brake can be actuated from the driver's position upon the load by leading the pull member 30 to a point convenient to the driver.

The improved device is simple in construction, can be inexpensively manufactured and applied, and does not add materially to the expense, and does not require material alteration in the construction of either the vehicle or the attachment to adapt it to the various forms of vehicles in common use.

Having thus described the invention, what is claimed as new is:

1. The combination with a vehicle including the rear axle and reach, the reach extending rearwardly of the axle, and brake mechanism, of a supporting member bearing at one end against the rear axle and at its upper side beneath the projecting portion of the reach, fastening devices connecting the supporting member to the reach, a lever pivoted to said supporting member, and a pull device connected to said supporting member and adapted to be coupled to the brake mechanism of the vehicle.

2. The combination with a vehicle including the body, the rear axle, reach, and a brake mechanism, said reach extending rearwardly of the axle, of a supporting member bearing at one end against the rear axle and at its upper side beneath the projecting portion of the reach, fastening devices connecting the supporting member to the reach, a suspension device connecting the supporting member to the vehicle body, an operating lever pivoted to said supporting member, and connecting means between said lever and brake mechanism.

In testimony whereof I affix my signature in presence of two witnesses.

HARVEY A. PINEGAR. [L. S.]

Witnesses:
R. W. SNYDER,
ELVA L. SNYDER.

---

Copies of this patent may be obtained for five cents each, by addressing the "Commissioner of Patents, Washington, D. C."